3,097,187
CHLORINATED PYROLYSIS OIL
John M. Mersereau, Cheshire, and Paul J. Mester, Naugatuck, Conn., assignors to United States Rubber Company, New York, N.Y., a corporation of New Jersey
No Drawing. Filed Nov. 8, 1961, Ser. No. 150,891
7 Claims. (Cl. 260—45.7)

This invention relates to new compositions of matter obtained from the treatment of the oily pyrolytic products of vulcanized rubber. More particularly, this invention relates to the chlorination of pyrolysis oil prepared from scrap rubber vulcanizates, the products obtained therefrom, and the use of said products as accelerating agents for the vulcanization of butyl rubber and as preventatives of heat-deterioration for butyl vulcanizates.

It has heretofore been known that the pyrolysis of vulcanized rubber produces a dark, oily, moderately fluid, characteristically foul-smelling distillate, hereinafter referred to as "pyrolysis oil." To obtain pyrolysis oil, vulcanized rubber (usually scrap rubber from automobile tires) is heated in a suitable container, such as a distilling flask, to temperatures as high as 600° C., although lower temperatures usually suffice. After a few minutes, vapors evolve as a result of the pyrolysis of the rubber. Initially, condensation of the vapors yields a pale yellow oil, but, as pyrolysis continues, heavier and darker oils distill over. The distillation is generally carried on until all of the fractions are recovered and there remains in the still a carbon residue consisting of the carbon present as such in the vulcanized rubber and carbon obtained from the burning of fibers or other materials which were present in the rubber.

A typical analysis of pyrolysis oil reveals the following physical characteristics:

(a) A content of approximately 90% neutral materials (hydrocarbons) and 6% acids;

(b) The presence of carbonyl and hydroxyl groups and considerable olefinic matter (by means of infrared spectrum);

(c) A broad peak at 255 mu and a broad trough at 240 mu (by means of ultraviolet spectrum);

(d) The presence of more than 20 components (by means of gas chromatography);

(e) An average molecular weight of 150–200;

(f) An acid number of approximately 8–9;

(g) A sulfur content of less than 1%.

Most scrap rubber comprises that obtained from road-worn or factory rejected automobile tires. Prior to World War II, these scrap tires consisted essentially of Hevea rubber vulcanizates, the pyrolysis of which gave oils suitable for use as drying oils, varnishes, rubber reclaiming agents, and solvents, as illustrated in U.S. Patents Nos. 1,986,050 and 2,039,112. Since World War II, however, scrap tires have contained an ever increasing proportion of synthetic rubber, generally butadiene-styrene copolymer rubber, until, about 1953, a 55:45 ratio of butadiene-styrene copolymer to Hevea natural rubber was attained. This ratio has persisted substantially constant ever since.

We have discovered that, by chlorinating pyrolysis oil derived from scrap rubber vulcanizates consisting of from about 40 to about 60 percent by weight of natural rubber and, correspondingly, from about 60 to about 40 percent by weight of butadiene-styrene copolymer rubber, new compositions of mater are obtained which are effective accelerators for the vulcanization of butyl rubber and which are effective retardants of deterioration when butyl vulcanizates are exposed to heat.

The term "butyl rubber," as used herein, comprises the rubbery copolymers made by copolymerizing a major proportion of isoolefin, usually isobutylene, with a minor proportion of a conjugated diolefin, usually isoprene or butadiene. Usually, these copolymers are composed of the isoolefin and the diolefin in proportions ranging from 90 to 99.5 parts of isoolefin and, correspondingly, 10 to 0.5 parts of diolefin, and preferably, from 95 to 99.5 parts of isoolefin and, correspondingly, 5 to 0.5 parts of diolefin. The isoolefins used generally have from 4 to 7 carbon atoms, and such isomonoolefins as isobutylene or ethyl methyl ethylene are preferred. The diolefin employed is usually isoprene, but can also be other ordinary open chain conjugated diolefins having from 4 to 8 carbon atoms, e.g., butadiene, piperylene, 2,3-dimethylbutadiene, and the like.

In accordance with this invention, the oily pyrolytic products of vulcanized rubber, consisting of vulcanized natural rubber and butadiene-styrene copolymer rubber in proportions ranging from about 40–60 to about 60–40 by weight, are chlorinated with gaseous chlorine. As the extent of chlorination is increased, the original moderately-fluid pyrolysis oil changes to a viscous liquid and then to a resinous solid. When treating with chlorine, the pyrolysis oil should preferably be in the form of an aqueous emulsion, or dissolved in an inert organic solvent such as chloroform, in order to overcome the increasing viscosity of the oil upon chlorination, which hinders stirring. It has further been found that agitation and raising the temperature to about 170° C. during the chlorination step aid the chlorination reaction. Although chlorination proceeds at ambient temperatures, it will proceed faster at elevated temperatures up to about 170° C., above which charring will generally be observed. After chlorination, the aqueous layer may be separated from the chlorinated pyrolysis oil by decantation while, in the other case, the inert organic solvent may be removed by distillation. For the purposes of this invention, the chlorinated pyrolysis oil should have a chlorine content of from about 30% to about 65%, and preferably from about 35% to about 50%, by weight of the chlorinated oil.

The products of this invention are useful accelerating agents for the vulcanization of butyl rubber. The chlorinated pyrolysis oil is mixed with butyl rubber curing formulations at temperatures of about 350° F. for a short time, and the butyl rubber is then vulcanized. It has been found that vulcanized butyl rubber containing about 0.5–4%, and preferably about 0.5–2%, by weight of the chlorinated pyrolysis oil of this invention, based on the weight of butyl rubber, has an unusually high modulus, an extraordinary resistance to deterioration upon exposure to heat, and requires an unusually short period of curing time.

The preparation and properties of the chlorinated pyrolysis oils of this invention are more fully set forth in the following examples which illustrate but do not limit the invention, since numerous modifications and variations therein will be apparent to those skilled in the art.

EXAMPLE 1

This example illustrates a method of obtaining pyrolysis oil from scrap rubber vulcanizates. Two hundred and fifty grams of cracked (16 mesh) whole tire scrap, containing a total of about 40 percent by weight of natural rubber and butadiene-styrene copolymer rubber in approximately equal proportions (55 SBR:45 NR), the remaining 60 percent being fiber, carbon black and miscellaneous rubber chemicals, from which the ferrous metals but not the fibers had been removed, were charged into a 1000 ml. distilling flask equipped with a water condenser, and receiver. The distilling flask was heated with gas burners and the rubber scrap pyrolyzed over a temperature range of 500°–600° C. at atmospheric pressure. Approximately 125 grams of dark pyrolysis oil were collected.

EXAMPLE 2

An emulsion of 300 grams of pyrolysis oil, obtained according to the procedure detailed in Example 1, in 300 grams of water was charged into a 2-liter flask equipped with a reflux condenser, stirrer, gas inlet and gas outlet. Chlorine gas was injected into the flask below the surface of the emulsion for 7 days at room temperature with stirring and slowly enough so as to allow complete absorption of the gas by the pyrolysis oil. The chlorinated viscous product was then separated from the aqueous layer and heated on a steam bath for several hours in order to evaporate any remaining water and to destroy any unstable chlorine compounds. A dark viscous oil weighing 377 grams, having a characteristic odor and a chlorine content of 36%, based on the weight of said oil, was obtained. Attempts to distill this chlorinated pyrolysis oil resulted in char formation.

A portion of the above product was incorporated into a typical butyl rubber compounding formulation, Table I, column B, by Banbury-mixing at 350° F. for 10 minutes and the product of mixing was then cured. The physical test data obtained on the resulting butyl vulcanizate are listed in the corresponding column of Table II. For comparison purposes, a "control," lacking the chlorinated pyrolysis oil, was similarly treated, as shown in column A of Tables I and II. These data clearly reveal the accelerating effect and the modulus-enhancing properties obtained from using 1.7 parts of chlorinated pyrolysis oil in the butyl vulcanizate. An "accelerating" effect is the phenomenon of reduced elongation normally accompanied by increased modulus and tensile strength of tensile specimens at low vulcanizing times. Thus, for 10 min. curing time, "B" has lower elongation and higher modulus than "A." Higher modulus or tensile at extended cure time (e.g.—60 min. modulus of "A" is only 675, while "B" is 950) does not indicate an "accelerating" effect, since presumably after one hour, complete vulcanization has occurred. Higher modulus is desirable with Butyl because of its tendency to cold flow. Acceleration is desirable because vulcanizing for shorter periods allows increased production.

EXAMPLE 3

An emulsion of 400 grams of pyrolysis oil in 400 grams of water was similarly chlorinated as in Example 2 until the product had a chlorine content of 45%, based on the weight of chlorinated oil. Incorporation of 1.7 parts of this chlorinated pyrolysis oil in a butyl rubber compounding formulation, Table I, column C, increased the modulus values of the resulting butyl vulcanizate by about one-third, as shown in Table II, column C (as compared with the modulus values for the "control" in column A).

EXAMPLE 4

Using apparatus similar to that employed in Example 2, a solution of 50 grams of pyrolysis oil in 50 grams of chloroform was chlorinated at room temperature, the chlorine being introduced as rapidly as the chlorine could be absorbed. After a few hours, absorption became very slight and the temperature was raised so as to produce refluxing by means of a Westinghouse RS–275 watt sunlamp placed immediately beneath the reaction flask. The chlorine gas was introduced continuously for 72 hours. After 72 hours, the chloroform was removed on a steam bath and 139 grams of a dark, viscous, translucent, chlorinated pyrolysis oil containing 65% of chlorine, based on the weight of chlorinated oil, was obtained.

Incorporation of 0.8–3.4 parts of this chlorinated pyrolysis oil in butyl rubber compounding formulations, Table I, columns D through I (columns D and H being "controls"), increased the modulus values of the resulting butyl vulcanizates as shown in the corresponding columns of Table II.

The stabilizing effect of chlorinated pyrolysis oil upon the above butyl rubber vulcanizates during exposure to heat-aging is illustrated in Table III. The "control" stocks deteriorated by reverting to a highly elastic "uncured" state as a result of the extensive heat-aging. However, the samples containing the chlorinated pyrolysis oil of this invention were far superior in resisting reversion.

EXAMPLE 5

A solution of 190 grams of pyrolysis oil in 100 ml. of chloroform was heated to reflux temperature by means of a Glas-Col heating mantle employing the usual reflux apparatus. Chlorine gas was then introduced into the solution as fast as absorption would permit. The temperature was raised to 170° C. and maintained for 72 hours, chlorine gas being introduced continuously. After 72 hours, three hundred and seventy-four grams of a dark tarry product, having a chlorine content of 48%, were decanted from the chloroform layer. The product is viscous when hot, and, upon cooling, hardens to a resinous solid.

This solid chlorinated pyrolysis oil product was powdered and from 1 to 2 parts incorporated into the butyl tire-curing bag formulations shown in Table I, columns J through N (columns J and L being "controls"). The data on the accelerating and the modulus-raising properties of the resulting vulcanizates are reported in the corresponding columns of Table II, the acceleration being evidenced by the lower elongation and higher tensile and modulus (at a low-curing time of 10 minutes) of the specimens containing chlorinated pyrolysis oil. The data in the corresponding columns of Table III demonstrate the improved heat-aging properties of these vulcanizates. By improved "heat-aging" properties, we mean resistance to deterioration of tensile properties upon being exposed to high temperatures for an extended period. This property is desirable for automobile tires, which, when in use, may become hot for long periods of time, and for tire "curing bags" which enclose tires ("mold" them) while they are being vulcanized. Samples D through I and samples L through N were heat-aged for 48 hours at 300° F. in the absence of oxygen to simulate tire-curing bag conditions. Samples J and K were aged for 96 hours in oxygen at 70° F. to simulate the exposure of tires under road conditions. From the data, it is clear that the presence of 1–2 parts of chlorinated pyrolysis oil is quite beneficial to maintaining the modulus and tensile properties of butyl rubber vulcanizates under high temperatures.

Table I
CHLORINATED PYROLYSIS OIL IN BUTYL RUBBER FORMULATIONS

| | A | B | C | D | E | F | G | H | I | J | K | L | M | N |
|---|---|---|---|---|---|---|---|---|---|---|---|---|---|---|
| GR-I 215 [1] | 100 | 100 | 100 | 100 | 100 | 100 | 100 | 100 | 100 | [2] 100 | [2] 100 | | | |
| GR-I 325 [3] | | | | | | | | | | | | 100 | 100 | 100 |
| Reclaimed Butyl [2] | | 10 | 10 | 10 | | | | | | | | | | |
| Spheron [4] No. 6 black | 45 | 45 | 45 | 45 | 45 | 45 | 45 | 45 | 45 | | | | | |
| Stearic acid | 0.7 | 0.7 | 0.7 | 0.7 | 0.7 | 0.7 | 0.7 | 0.7 | 0.7 | | | | | |
| HAF black | | | | | | | | | | 64 | 64 | 64 | 64 | 64 |
| Zinc laurate | | | | | | | | | | 2 | 2 | 2 | 2 | 2 |
| Chlorinated P.O. | | 1.7 | 1.7 | | 0.8 | 1.7 | 3.4 | | 1.7 | | 1 | | 1 | 2 |
| 516 H oil (160-180) [5] | 4.9 | 4.9 | 4.9 | 4.9 | 4.9 | 4.9 | 4.9 | 4.9 | 4.9 | 5 | 5 | 5 | 5 | 5 |
| SP 1045 resin [6] | 1 | 1 | 1 | 1 | 1 | 1 | 1 | | | | | | | |
| ST 137 resin [7] | | | | | | | | | | 7 | 7 | 7 | 7 | 7 |
| Above masterbatch | 100 | 100 | 100 | 100 | 100 | 100 | 100 | 100 | 100 | 100 | 100 | 100 | 100 | 100 |
| Zinc oxide | 3.3 | 3.3 | 3.3 | 3.3 | 3.3 | 3.3 | 3.3 | | | | | | | |
| Antioxidant | 0.65 | 0.65 | 0.65 | 0.65 | 0.65 | 0.65 | 0.65 | | | | | | | |
| MBTS [8] | 0.65 | 0.65 | 0.65 | 0.65 | 0.65 | 0.65 | 0.65 | | | | | | | |
| Accelerator | 0.8 | 0.8 | 0.8 | 0.8 | 0.8 | 0.8 | 0.8 | | | | | | | |
| Sulfur | 0.8 | 0.8 | 0.8 | 0.8 | 0.8 | 0.8 | 0.8 | | | | | | | |
| SnCl$_2$· 2H$_2$O | | | | | | | | 1.6 | 1.6 | 1.8 | 1.8 | 1.8 | 1.8 | 1.8 |
| SP 1045 resin | | | | | | | | 6.0 | 6.0 | | | | | |

[1] A butyl rubber of polyisobutylene containing 2.5% isoprene units; manufactured by Enjay Co.
[2] No. 453 Reclaim, a butyl tube reclaim; manufactured by Naugatuck Chemical Div. of U.S. Rubber Co.
[3] A butyl rubber of polyisobutylene containing 3.0% isoprene units; manufactured by Enjay Co.
[4] A medium processing channel carbon black; manufactured by Godfrey L. Cabot, Inc.
[5] A rubber plasticizing oil; manufactured by the Sun Oil Co.
[6] A phenolic resin; manufactured by the Schenectady Varnish Co.
[7] A phenolic resin; manufactured by Rohm & Haas Co.
[8] Mercaptobenzothiazole disulfide.

Table II
PHYSICAL DATA OBTAINED ON BUTYL VULCANIZATES CURED AT 340° F.

| | Curing time (mins.) | A | B | C | D | E | F | G | H | I | J | K | L | M | N |
|---|---|---|---|---|---|---|---|---|---|---|---|---|---|---|---|
| Elongation | 10 | 620 | 570 | 565 | | | | | | | 490 | 250 | 475 | 450 | 360 |
| | 30 | 615 | 560 | 550 | | | | | | | 480 | 270 | 435 | 425 | 330 |
| | 45 | 615 | 550 | 570 | | | | | | | | | | | |
| | 60 | 685 | 600 | 585 | | | | | | | 470 | 315 | 360 | 380 | 335 |
| Modulus 300% | 10 | 950 | 1200 | 1,150 | | | | | | | 750 | | 1,175 | 1,375 | 1,500 |
| | 30 | 950 | 1,250 | 1,200 | | | | | | | 975 | | 1,300 | 1,475 | 1,600 |
| | 45 | 950 | 1,100 | 1,075 | | | | | | | | | | | |
| | 60 | 675 | 950 | 950 | | | | | | | 1,076 | 2,100 | 1,600 | 1,700 | 1,900 |
| Tensile | 10 | 2,650 | 2,650 | 2,725 | | | | | | | 1,325 | 1,375 | 1,650 | 1,875 | 1,675 |
| | 30 | 2,625 | 2,600 | 2,675 | | | | | | | 1,475 | 1,550 | 1,675 | 1,950 | 1,875 |
| | 45 | 2,350 | 2,450 | 2,650 | | | | | | | | | | | |
| | 60 | 2,275 | 2,400 | 2,400 | | | | | | | 1,770 | 2,200 | 1,775 | 2,025 | 2,075 |
| Elongation | 15 | | | | 585 | 490 | 510 | 570 | 1,295 | 720 | | | | | |
| | 30 | | | | 600 | 520 | 500 | 510 | 1,170 | 675 | | | | | |
| | 45 | | | | 600 | 520 | 490 | 510 | 965 | 485 | | | | | |
| Modulus 300% | 15 | | | | 1,000 | 1,200 | 1,100 | 1,000 | 100 | 50 | | | | | |
| | 30 | | | | 1,000 | 1,200 | 1,225 | 1,075 | 75 | 75 | | | | | |
| | 45 | | | | 900 | 1,200 | 1,275 | 1,225 | 75 | 1,000 | | | | | |
| Tensil | 15 | | | | 2,725 | 2,500 | 2,525 | 2,500 | 150 | 450 | | | | | |
| | 30 | | | | 2,725 | 2,650 | 2,550 | 2,250 | 275 | 600 | | | | | |
| | 45 | | | | 2,600 | 2,725 | 2,650 | 2,550 | 450 | 2,175 | | | | | |

Table III
PHYSICAL DATA OBTAINED FROM HEAT-AGED VULCANIZATES

| | Curing time (mins.) | Heat-aged for 48 hrs. at 300° F. without O$_2$ | | | | | | Aged for 96 hours at 70° F. in O$_2$ | | Heat-aged for 48 hrs. at 300° F. without O$_2$ | | |
|---|---|---|---|---|---|---|---|---|---|---|---|---|
| | | D | E | F | G | H | I | J | K | L | M | N |
| Elongation | 15 | 560 | 500 | 465 | 385 | (¹) | 480 | | | | | |
| | 45 | (¹) | 500 | 505 | 390 | (¹) | 500 | | | | | |
| Modulus 300% | 15 | 600 | 650 | 850 | 1,000 | (¹) | 200 | | | | | |
| | 45 | (¹) | 600 | 725 | 950 | (¹) | 600 | | | | | |
| Tensile | 15 | 1,250 | 1,200 | 1,425 | 1,350 | (¹) | 400 | | | | | |
| | 45 | (¹) | 1,125 | 1,225 | 1,350 | (¹) | 1,125 | | | | | |
| Elongation | 10 | | | | | | | | | 490 | 250 | 200 |
| | 30 | | | | | | | | | 480 | 270 | 215 |
| | 60 | | | | | | | 645 | 495 | 470 | 315 | 215 |
| Modulus 300% | 10 | | | | | | | | | 750 | | |
| | 30 | | | | | | | | | 975 | | |
| | 60 | | | | | | | 675 | 1,050 | 1,075 | 2,100 | |
| Tensile | 10 | | | | | | | | | 1,325 | 1,375 | 1,310 |
| | 30 | | | | | | | | | 1,475 | 1,550 | 1,375 |
| | 60 | | | | | | | 2,000 | 2,075 | 1,700 | 2,200 | 1,300 |

¹ Reverted to the uncured state.

Having thus described our invention, what we claim and desire to protect by Letters Patent is:

1. A composition of matter comprising the product of chlorination of pyrolysis oil, said oil being obtained by the destructive distillation of vulcanized rubber, said rubber consisting of from about 40 to about 60 percent by weight of natural rubber and, correspondingly, from about 60 to about 40 percent by weight of butadiene-styrene copolymer rubber, and said product having a chlorine content of from about 30% to about 65% by weight, based on the weight of said product.

2. A composition of matter comprising the product of chlorination of pyrolysis oil, said oil being obtained by the destructive distillation of vulcanized rubber consisting of approximately equal proportions of natural rubber and butadiene-styrene copolymer rubber, and said product having a chlorine content of from about 35% to about 50% by weight, based on the weight of said product.

3. A butyl rubber vulcanizate comprising (1) the rubbery copolymer obtained from the copolymerization of from about 90 to 99.5 parts of an isoolefin having from 4 to 7 carbon atoms with, correspondingly, from about 10 to 0.5 parts of a conjugated diolefin having from 4 to 8 carbon atoms, and (2) from about 0.5 to about 4 parts of the composition of claim 1 per 100 parts of said copolymer.

4. The butyl rubber vulcanizate of claim 3 wherein the isoolefin is isobutylene and the diolefin is isoprene.

5. A butyl rubber vulcanizate comprising (1) the rubbery copolymer obtained from the copolymerization of from about 90 to 99.5 parts of an isoolefin having from 4 to 7 carbon atoms with, correspondingly, from about 10 to 0.5 parts of a conjugated diolefin having from 4 to 8 carbon atoms, and (2) from about 0.5 to about 4 parts of the composition of claim 2 per 100 parts of said copolymer.

6. The butyl rubber vulcanizate of claim 5 wherein the isoolefin is isobutylene and the diolefin is isoprene.

7. A butyl rubber vulcanizate comprising (1) the rubbery copolymer obtained from the copolymerization of from about 95 to 99.5 parts of isobutylene with, correspondingly, from about 5 to 0.5 parts of isoprene, and (2) from 0.5 to 2 parts of the composition of claim 1 per 100 parts of said copolymer.

References Cited in the file of this patent

UNITED STATES PATENTS

| | | |
|---|---|---|
| 1,986,050 | Fairley | Jan. 1, 1935 |
| 2,039,112 | Pickett | Apr. 28, 1936 |